(12) United States Patent
Frese et al.

(10) Patent No.: US 7,122,078 B2
(45) Date of Patent: Oct. 17, 2006

(54) INK JET INK COMPOSITION

(75) Inventors: Peter Frese, Landshut (DE); Richard D. Bauer, Kenneth Square, PA (US); Marc Egen, Wiesbaden (DE); Klaus Taennert, Wuppertal (DE); Martin Wulf, Langenfeld (DE); Rudolf Zentel, Nierstein (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 20 days.

(21) Appl. No.: 11/002,381

(22) Filed: Dec. 2, 2004

(65) Prior Publication Data

US 2005/0137283 A1    Jun. 23, 2005

Related U.S. Application Data

(60) Provisional application No. 60/531,772, filed on Dec. 22, 2003.

(51) Int. Cl.
*C09D 11/02* (2006.01)
(52) U.S. Cl. .................................... 106/31.6
(58) Field of Classification Search ................ 106/31.6
See application file for complete search history.

(56) References Cited

U.S. PATENT DOCUMENTS

| 4,239,543 A | 12/1980 | Beasley |
| 4,381,946 A | 5/1983 | Uehara et al. |
| 4,911,903 A | 3/1990 | Unger et al. |
| 5,085,698 A | 2/1992 | Ma et al. |
| 5,231,131 A | 7/1993 | Chu et al. |
| 5,494,949 A | 2/1996 | Kinkel et al. |
| 5,618,872 A | 4/1997 | Pohl et al. |
| 5,698,309 A | 12/1997 | Dallmann et al. |
| 5,753,016 A | 5/1998 | Hayashi et al. |
| 5,846,310 A | 12/1998 | Noguchi et al. |
| 6,106,598 A * | 8/2000 | Iijima ..................... 106/31.27 |
| 6,337,131 B1 | 1/2002 | Rupaner et al. |
| 6,457,824 B1 | 10/2002 | Wexler |
| 6,818,051 B1 * | 11/2004 | Anselmann et al. ........ 106/401 |
| 2003/0116062 A1 | 6/2003 | Anselmann et al. |
| 2003/0125416 A1 | 7/2003 | Munro et al. |

FOREIGN PATENT DOCUMENTS

| DE | 4316814 | 11/1994 |
| EP | 0556649 | 8/1993 |
| EP | 0644914 | 3/1995 |
| EP | 0955323 | 11/1999 |
| EP | 1184195 | 3/2002 |
| WO | WO01/88044 | 11/2001 |
| WO | WO01/94476 A2 | 12/2001 |
| WO | WO03/058299 | 7/2003 |

\* cited by examiner

*Primary Examiner*—David Sample
*Assistant Examiner*—Veronica Faison-Gee
(74) *Attorney, Agent, or Firm*—Steven C Benjamin

(57) ABSTRACT

The invention relates to an ink jet ink composition containing monodisperse polymer particles to provide an opaque ink with improved color brilliancy, ink jet ink sets based on this composition, and a methods for ink jet printing with the ink and/or ink jet sets.

11 Claims, No Drawings

INK JET INK COMPOSITION

CROSS REFERENCE TO RELATED APPLICATION

This application claims the benefit of U.S. Provisional Application No. 60/531,772, filed Dec. 22, 2003, which is hereby incorporated by references in its entirely.

FIELD OF THE INVENTION

The invention relates to an ink jet ink composition containing monodisperse polymer particles to provide an opaque ink with improved color brilliancy, ink jet ink sets based on this composition, and a methods for ink jet printing with the ink and/or ink jet sets.

BACKGROUND OF THE INVENTION

Ink jet inks are well known in the art and are typically liquid compositions comprising a carrier liquid, colorants such as dyes or pigments, and optional additives such as thickeners and preservatives to obtain the desired properties. Different types of colorants may be used for inks, for example, simple color pigments and water-soluble dyes.

Novel pigments have been found which resemble naturally occurring opals and wherein the color activity is produced by Bragg diffraction of the incident light on the grid planes of the spheres arranged in a crystal-like manner on the substrate surface (the spheres diffract the light according to Bragg's law).

WO01/88044 describes pigments with an opalescent effect. The pigment particles consist of monodisperse spheres in a three-dimensional, tightly packed and regularly arranged structure, also called three-dimensional photonic crystals, with a diameter of 50 nm to 2 µm. The pigments may be prepared by suspensing of the monodisperse spheres in a liquid medium, applying the suspension on a surface, removing the liquid medium and separating the particles from the surface. The pigments may be used for coating substrate surfaces and the pigmentation of printing paints, e.g. in the way of pigment pastes, in combination with inorganic or organic colorants.

According to WO03/058299 such particles are fixed in a polymeric matrix for the use as pigment particles in coating compositions.

EP-A-0955323 describes core/shell particles that may be used as special effect pigments for the use in coatings, paints and inks. With respect to their cores, the particles may have a regular arrangement and are based substantially on high molecular polymers. The particulated pigments may be applied to the substrates in the form of solid, liquid or paste preparations with the aid of auxiliary constituents and additives.

In EP-A-1184195, an ink jet method is described wherein the ink jet recording material such as paper or plastic comprises a top layer containing core-shell particles of refractive nature.

The disclosures of all of the above-identified publications are incorporated by reference herein for all purposes as if fully set forth.

SUMMARY OF THE INVENTION

The invention provides an ink jet ink composition comprising:
(a) about 30 to about 99.5 wt % of a carrier liquid, and
(b) about 0.5 to about 70 wt % of monodisperse particles, based on the total weight of the ink jet ink composition.

The ink jet ink composition according to the invention may be used as a dilution, dispersion and/or slurry. Preferably the monodisperse particles are stably dispersed in the carrier liquid. The inks may be colored with a colorant such as pigment or dye, or may contain substantially no added colorant.

The ink jet ink composition according to the invention provides high opaque property that is distinguished by a good optical brilliance and color stability of the print.

In accordance with another aspect of the present invention, there is provided an ink set comprising:
(1) an ink jet ink comprising a carrier liquid and a colorant, and
(2) an ink jet ink as set forth above, containing substantially no colorant.

Preferably the ink set comprises at least three differently colored inks, and the ink jet ink as set forth above, containing substantially no colorant.

In accordance with another aspect of the present invention, there is provided an ink set comprising at least three differently colored inks, wherein at least one of the inks is an inkjet ink as set forth above.

In yet another aspect of the present invention, there is provided a method for ink jet printing onto a substrate, comprising the steps of:
(a) providing an ink jet printer that is responsive to digital data signals;
(b) loading the printer with a substrate to be printed;
(c) loading the printer with an ink as set forth above and described in further detail below, or an ink jet ink set as set forth above and described in further detail below; and
(d) printing onto the substrate using the ink or inkjet ink set in response to the digital data signals.

Preferred substrates include coated (such as glossy and photo) papers and plastics (such as vinyls).

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS MONODISPERSE PARTICLES

The monodisperse particles which may be used according to the invention are able to form three-dimensional photonic crystals on the substrate surface after application on the substrate surface by arranging in a three-dimensional, tightly packed, regular and spherical structure on the substrate surface.

The particles have an average diameter of about 50 nm to about 1,500 nm. Monodisperse spheres with a diameter of about 150 nm to about 800 nm are preferably used, particularly preferably with a diameter of about 200 nm to about 500 nm.

Relating to the average diameter of the monodisperse particles usable according to the invention the reflection of the wavelengths of the visible light are different from each other in a distinct manner, and the color effects are of special brilliance.

To ensure the optical properties of the monodisperse particles, the difference in the refractive indices of the monodisperse particles and of any other ink jet ink components, such as additional binder and/or additives and pigments, should be in a range of about 0.01 to about 2, preferably about 0.02 to about 1.5. Optimal refractive index differences are, for example, in the range of about 0.1 to about 1.5, deviations from this also being possible.

The monodisperse particles according to the invention may consist of almost any material if it is able to permit the wavelengths of the desirable light reflexes.

Suitable materials for the monodisperse particles according to the invention include, for example, metal oxides, metal chalcogenides and silicon dioxide. The preparation of monodisperse particles from silicon dioxide is described in U.S. Pat. No. 4,911,903 (the disclosure of which is incorporated by reference herein for all purposes as if fully set forth).

Monodisperse particles based of silicon dioxide may also be coated with non-absorbent metal oxides such as titanium oxide, zirconium oxide, zinc oxide, tin oxide and/or aluminium oxide, as described in U.S. Pat. No. 5,846,310 (the disclosure of which is incorporated by reference herein for all purposes as if fully set forth), or with absorbent metal oxides such as iron oxide.

As indicated above, the monodisperse particles may also be based on metal oxides such as titanium dioxide, zirconium oxide, zinc oxide, tin oxide, aluminium oxide and mixtures thereof, as mentioned in EP-A-0644914 (the disclosure of which is incorporated by reference herein for all purposes as if fully set forth). These may be coated with organic materials, for example silanes, as mentioned in DE-A-4316814 (the disclosure of which is incorporated by reference herein for all purposes as if fully set forth).

Monodisperse particles based on polymers, for example polystyrene, polyester, polyamides, polyurethane or poly(meth)acrylates, may also be used. Polymer spheres of this type may contain metal oxide inclusions.

Monodisperse particles which are produced from fluorinated (meth)acrylates, in particular fluorinated alkyl(meth)acrylates with C2–C8 alkyl groups, are particularly suitable. Examples of such fluorinated (meth)acrylates include trifluoroethylmethacrylate, perfluoropropylmethacrylate, perfluorobutylmethacrylate, wherein the resulting polymers may also have contents of tetrafluorobutylbis(meth)acrylate or pentaerythritoltetra(meth)acrylate units in addition to fluorinated side chains. These polymers may be crosslinked, in which case they may be self-crosslinking or may be caused to crosslink by the use of crosslinking agents. Examples of crosslinking agents include cinnamoylalkyl(meth)acrylates, tetrafluorobutylbis(meth)acrylates or pentaerythritoltetra(meth)acrylates.

Monodisperse particles based on fluorinated, crosslinked poly(meth)acrylates are preferably used for the ink jet ink composition according to the invention.

Polymers of this type may be produced by suspension polymerization of the monomers.

The production of a polymethacrylate from 2,2,2-trifluoroethylmethacrylate and crosslinking with pentaerythritoltetramethacrylate (PEMA) is exemplified below:

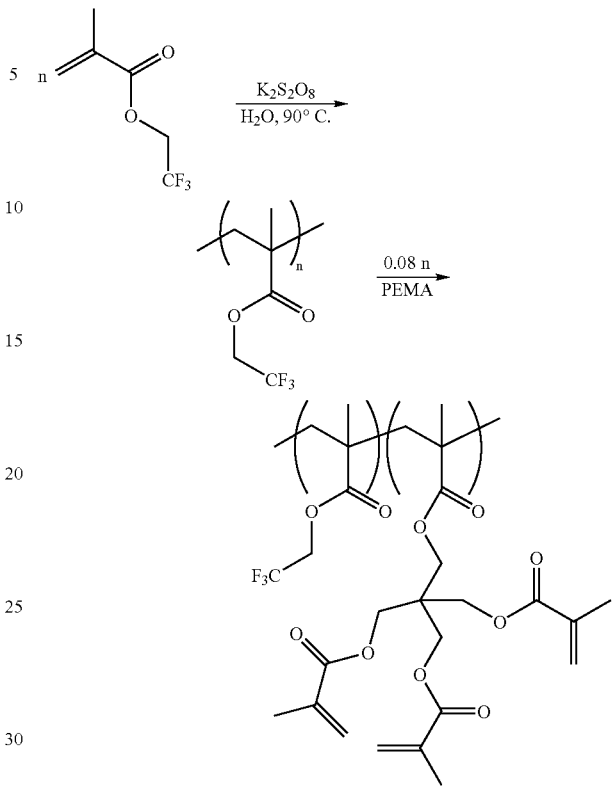

The aqueous suspension produced during production of the monodisperse particles by suspension polymerization may be directly used as ink composition according to the invention by jetting the suspension onto the substrate to be printed.

Monodisperse particles produced by using photonic crystals which are reduced to monodisperse particles of an average diameter of 50 nm to 1,500 nm may also be used as monodisperse particles according to the invention. The photonic crystals may be produced e.g., by suspension polymerisation of the above mentioned monomers, or by suspension of monodisperse particles in a liquid medium and by spraying the suspension on a surface so drops form on the surface, or the suspension is deposited onto a substrate as a liquid film. After drying and solidifying, the corresponding photonic crystals are produced and may be removed from the surface by a dry or wet method.

After drying, the corresponding photonic crystals result on the substrate surface.

The monodisperse particles may be present in the ink according to the invention in a concentration of from about 0.1 to about 70 wt %, preferably from about 1 to about 50 wt %, more preferably from about 1 to about 30 wt %, and particularly preferably in a concentration of from about 5 to about 20 wt %, based on the total weight of the ink jet ink composition.

An ink composition which contains the monodisperse particles in a quantity of from about 5 to about 20 wt %, based on the total weight of the ink composition, wherein the particles are based on fluorinated crosslinked poly(meth)acrylates is stable for a long time, e.g., for half a year and even longer.

The surface of the monodisperse particles may optionally be modified in such a way that, after supplying heat, thermal radiation or UV radiation, the spheres are crosslinked with one another so solidification of the structure may be induced.

The monodisperse particles should be substantially insoluble in the carrier liquid, and should be stably dispersed therein.

This can be accomplished, for example, by including appropriate functionality in the polymer of the monodisperse particle. Water-dispersibility can be provided, for example, by including appropriately neutralized ionic functionality (such as amine-neutralized carboxyl groups), and/or non-ionic soluble groups (such as polyethylene oxide segments).

Stable dispersions can also be achieved through the use of separate dispersing agents/surfactants, as discussed in more detail below.

Carrier Liquid

The carrier liquid can be an aqueous or nonaqueous vehicle, so long as the components of the carrier liquid are compatible with the monodisperse particles (i.e., do not dissolve the particles).

The term "aqueous vehicle" refers to water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

"Nonaqueous vehicle" refers a vehicle that is substantially comprised of a nonaqueous solvent or mixtures of such solvents, which solvents can be polar and/or nonpolar. Examples of polar solvents include alcohols, esters, ketones and ethers, particularly mono- and di-alkyl ethers of glycols and polyglycols such as monomethyl ethers of mono-, di- and tri-propylene glycols and the mono-n-butyl ethers of ethylene, diethylene and triethylene glycols. Examples of nonpolar solvents include aliphatic and aromatic hydrocarbons having at least six carton atoms and mixtures thereof including refinery distillation products and by-products.

Even when no water is deliberately added to the nonaqueous vehicle, some adventitious water may be carried into the formulation, but generally this will be no more than about 2–4%. By definition, the nonaqueous ink of this invention will have no more than about 10%, and preferably no more than about 5%, by weight of water based on the total weight of the nonaqueous vehicle.

The amount of carrier liquid in the ink is typically in the range of about 30 to about 99.5 wt %, preferably from about 70 to about 99 wt %, and more preferably from about 80 to about 99%, based on total weight of the ink.

Optional Ingredients

Other ingredients may be formulated into the ink jet ink, to the extent that such other ingredients do not interfere with the stability and jetablity of the ink, or the monodisperse particles, which may be readily determined by routine experimentation. Such other ingredients are in a general sense well known in the art.

Inks based on aqueous vehicles can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

Colorants such as dyes or pigments usually used for ink jet ink compositions may be used in the ink according to the invention. They may be used in addition to the other components of the ink jet ink or they can be within the monodisperse particles themselves.

Conventional dyes such as anionic, cationic, amphoteric and non-ionic dyes are useful in this invention. Such dyes are well known to those of ordinary skill in the art. Anionic dyes are those dyes that, in aqueous solution, yield colored anions. Cationic dyes are those dyes that, in aqueous solution, yield colored cations. Typically anionic dyes contain carboxylic or sulfonic acid groups as the ionic moiety. Cationic dyes usually contain quaternary nitrogen groups.

The types of anionic dyes useful in this invention are, for example, Acid, Direct, Food, Mordant and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most useful in this invention include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known to those skilled in the art.

Useful dyes include (cyan) Acid Blue 9 and Direct Blue 199; (magenta) Acid Red 52, Reactive Red 180, Acid Red 37, CI Reactive Red 23; and (yellow) Direct Yellow 86, Direct Yellow 132 and Acid Yellow 23. The black colorant may also be dye as, for example, the black dye disclosed in U.S. Pat. No. 5,753,016 (the disclosure of which is incorporated by reference herein for all purposes as if fully set forth).

Pigments, traditionally, are stabilized to dispersion in a vehicle by dispersing agents, such as polymeric dispersants or surfactants. More recently though, so-called "self-dispersible" or "self-dispersing" pigments (hereafter "SDP") have been developed. As the name would imply, SDPs are dispersible in water, or aqueous vehicle, without dispersants. The black pigment may be stabilized to dispersion by surface treatment to be self-dispersing (see, for example, WO01/94476, the disclosure of which is incorporated by reference herein for all purposes as if fully set forth), by treatment with dispersant in the traditional way, or by some combination of surface treatment and dispersant.

Preferably, when dispersant is employed, the dispersant(s) is a random or structured polymeric dispersant. Preferred random polymers include acrylic polymer and styrene-acrylic polymers. Most preferred are structured dispersants, which include AB, BAB and ABC block copolymers, branched polymers and graft polymers. Some useful structured polymers are disclosed in U.S. Pat. No. 5,085,698, EP-A-0556649 and U.S. Pat. No. 5,231,131, the disclosures of which are incorporated by reference herein for all purposes as if fully set forth.

Useful pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Useful pigments include (cyan) Pigment Blue 15:3 and 15:4: (magenta) Pigment Red 122; (yellow) Pigment Yellow 128, Pigment Yellow 95, Pigment Yellow 155 and Pigment Yellow 74; and, (black) carbon black.

In a colored ink, colorant will generally be present in amounts up to about 12%, and more typically in the range of about 0.1 to about 9%, by weight of the total ink. Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

Polymers may be added to the ink to improve durability (binders). The polymers can be soluble in the vehicle or dispersed (e.g. "emulsion polymer" or "latex"), and can be ionic or nonionic. Suitable binders include polystyrene, polyesters, polyamides, polyurethanes, poly(meth)acrylates and fluorinated poly(meth)acrylates, in a quantity of about 0.1 to about 20 wt %, based on the total weight of the ink composition.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N", N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

These other additives (other than vehicle, monodisperse particles and colorants), when present, generally comprise a total of less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C. (30 cP or less), but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the inkjet-printing device it comes in contact with, and it should be essentially odorless and non-toxic.

The ink set of this invention can be particularly advantageous for applications where low viscosity is required. Thus the viscosity (at 25° C.) of the inventive inks can be less than about 7 cps, or less than about 5 cps, and even less than about 3.5 cps.

Ink Set

One of the ink sets in accordance with the present invention comprises:

(1) an ink jet ink comprising a carrier liquid and a colorant, and (2) an monodisperse particle-containing ink jet ink as set forth above, containing substantially no colorant. The other inks of the ink set may contain dyes, pigments or combinations thereof as the colorant. Such other inks are based on vehicles and other components and additives as described above and may, in a general sense, be considered known to those of ordinary skill in the art.

Another of the ink sets in accordance with the present invention preferably comprises at least three differently colored inks (such as CMY), and preferably at least four differently colored inks (such as CMYK), and further comprises a monodisperse particle-containing ink jet in as set forth above, containing substantially no colorant.

Still another of the ink sets in accordance with the present invention preferably comprises at least three differently colored inks (such as CMY), and preferably at least four differently colored inks (such as CMYK), wherein at least one of the inks is a monodisperse particle-containing ink jet in as set forth above.

Method of Printing

The invention also provides a method for ink jet printing onto a substrate, comprising the steps of:

(a) providing an ink jet printer that is responsive to digital data signals;

(b) loading the printer with a substrate to be printed;

(c) loading the printer with an ink or an ink jet ink set as set forth above; and (d) printing onto the substrate using the ink or inkjet ink set in response to the digital data signals.

In applying the inventive inks and ink sets, one ink can be jetted onto a substrate first, followed by the other, with some delay (seconds) in between, or the inks could be applied virtually simultaneously. The sequence and timing will depend on the needs of the application.

When using an ink set comprising a monodisperse particle-containing ink without colorant, a preferred application method is to apply this ink as an overprint onto at least a portion of the colored inks.

Conventional ink jet printers can be used as the printer, such as the printers of Hewlett Packard, Canon, Lexmark and Epson.

Substrates of different types may be printed with the ink jet ink composition according to the invention. The substrate may be a recording material such as plain paper, resin-coated paper, plastics, metal material such as metal foil, glass material, wood, textiles, e.g., with a thickness of about 10 to 500 μm.

Using the ink jet ink composition according to the invention, it is possible to produce printings with optical brilliance in the color and a color stability as well as ink absorptivity, in particular, owing to the high resistance to solvents and heat especially when using monodisperse particles based on fluorinated (meth)acrylate monomers.

EXAMPLES

Example 1

Production of an Ink Jet Ink Composition According to the Invention

The following inks were prepared by mixing and stirring the ingredients as mentioned:

| Ingredients (wt %) | Ink 1A | Ink 1B |
|---|---|---|
| Polymethylmethacrylate (30.8% solids) | 10 (based on solids) | |
| Dowanol DPM (dipropylene glycol methyl ether) | 10 | |
| Aerosol OT (surfactant), Cytec Ind. | 1 | |
| Black Pigment Dispersion (as 15% pigment) | | 4.5 |
| Glycerol | | 9 |
| Ethylene Glycol | | 6 |
| 1,2 hexanediol | | 5 |
| BYK 348 | | 0.1 |
| Water | Balance | Balance |
| pH | 3.5 | 8.0 |
| Viscosity cps @ 25° C. | 2.2 | 2.9 |

Polymethylmethacrylate was synthesized in a 2000 mL-flask with a nitrogen-inlet and a mechanical stirrer. The flask was put in a 90° C. oil bath, charged with 1200 ml deionized water and flushed with nitrogen for at least 45 min. After stopping the nitrogen-flow 100 ml methyl methacrylate (without further purification) was added. The water-monomer mixture was stirred for 30 min to achieve temperature equilibrium. Then 40 ml of a potassium peroxodisulfate-solution (10 wt %, heated for 10 min at 90° C. under nitrogen) was added at once (<10 sec) to start the polymerization. The reaction solution was stirred vigorously for 1.5 h. After this time samples of the polymer solution showed no color change. Therefore an almost complete conversion was assumed and the flask was opened (oxygen) to stop the polymerization. The resulted polymer particles were purified from large agglomerations by filtration through a standard paper filter. Filtration was followed by a centrifugation to get rid of smaller agglomerations and low molecular impurities. During centrifugation agglomeration sediment deposited as white solid on the bottom of the centrifugation vial. The desired polymer latices sediment deposited as an opalescent layer on top of the first layer. Low molecular impurities like monomer and initiator salt remained in the supernatant liquid. The first sediment layer was dumped and the liquid was exchanged with water in three to four centrifugation cycles.

Average diameter of the resulting particles: 277 nm

Black Pigment Dispersion was a polymer stabilized dispersion of carbon black pigment prepared by milling 3 parts by weight (PBW) pigment with 1 part graft copolymer dispersant in water. The graft copolymer dispersant was phenoxyethylacrylate-g-ethoxy-triethyleneglycol methacrylate-co-methacrylic acid, 66/4/30. The neutralizing agent for the dispersant was N,N-dimethylethanolamine and the pH was maintained in the range of 7–8. The pigment content in the final dispersion was adjusted with water to be 15% by weight.

Example 2

Print Test

The black pen of an Epson 3000 printer operating in the 1440 dpi mode was used to print 100% solid tint test patterns 1 inch by 6 inches wide onto Hewlett Packard Photo Glossy Paper (#61831A), Avery Vinyl (401-42986193), and Epson Photo paper (S041141). Ink 1A jetted easily and reliably.

Print Test 1

Ink 1A was printed on each substrate once. In a further experiment, each substrate was passed through the printer three times in rapid succession to give a printed layer three times as thick.

The printed samples were viewed under a fluorescent desk lamp about 18 inches directly overhead and the appearance was recorded below.

| SUBSTRATE | PASSES | APPEARANCE |
|---|---|---|
| AVERY VINYL | 1× | The printed coating appeared as a whitish layer when illuminated and viewed at about 90° to the substrate surface; when the viewing angle was less than 90°, the layer appeared a distinct reddish color; as the viewing angle became more shallow with respect to the plane of the substrate, the layer took on greenish overtones. The green overtones were enhanced when the sample was illuminated at an angle less than 90° and viewed at an angles less than 45°. |
| | 3× | The color effects were not appreciably more intense. |
| HP GLOSSY | 1× | A distinct pinkish color was observed when the sample was illuminated and viewed at about 45°. |
| | 3× | The color effects were not appreciably more intense. |
| EPSON PHOTO | 1× | At a viewing angle of about 45°, a distinct greenish overtone was observed. |
| | 3× | The color effects were not appreciably more intense. |

These results clearly demonstrate that the inkjet printed colorless latex particles have ordered on the surface of the substrate and created color that changed depending on the viewing angle.

Print Test 2

Ink 1B was loaded into the black pen of another Epson 3000 printer. A one inch by six inch wide test patch at 100% tint of black Ink 1B was printed in the 1440 dpi mode onto HP glossy paper and Avery vinyl. These test patterns were then overprinted with Ink 1A at 100% tint at 1440 dpi so that three of the six inches of the first printed pattern was covered. After drying, the samples were observed under a desk fluorescent lamp and the results were recorded below.

| SUBSTRATE | PASSES | APPEARANCE |
|---|---|---|
| HP GLOSSY | Black test pattern | The black printed layer was glossy black; the color was independent of the viewing angle |
| | Over-coated black pattern | The overprinted black area was a uniform hazy gray white color when viewed and illuminated at about 90; when viewed at a lower angle with respect to the substrate, the over-coated area had dark pinkish color with greenish overtones. At even lower angles the color became more greenish. The over-coated sample appeared most green when illuminated at 45° and viewed at about 45°. |
| Avery Vinyl | Black test pattern | The black printed layer was glossy black; the color was independent of the viewing angle |
| | Over-coated black pattern | When illuminated at 90° and viewed at slightly lower angles with respect the substrate surface, the overprinted area took on a strong iridescent pink color. At lower viewing angles, it took on a strong green iridescent color. When illuminated at about 45° and viewed at 45° it had a strong green iridescence. |

This experiment demonstrates that inkjet printed samples made with inks containing these colorless latex particles gave color effects that changed with illumination and viewing angle, especially when printed over a dark background.

What is claimed is:

1. An ink jet ink composition comprising:
   (a) about 30 to about 99.5 wt % of a carrier liquid, and
   (b) about 0.5 to about 70 wt % of monodisperse particles, based on the total weight of the ink jet ink composition, wherein the monodisperse particles comprise a poly(meth)acrylate.

2. The ink jet ink composition according to claim 1, wherein the monodisperse particles are able to form three-dimensional photonic crystals on the substrate surface after application on the substrate surface by arranging in a three-dimensional, tightly packed, regular and spherical structure on the substrate surface.

3. The ink jet ink composition according to claim 1, wherein the monodisperse particles have an average diameter of 150 to 800 nm.

4. The ink jet ink composition according to claim 3, wherein the monodisperse particles have an average diameter of 200 to 500 nm.

5. The ink jet ink composition according to claim 1, wherein the monodisperse particles comprise a fluorinated poly(meth)acrylate.

6. The ink jet ink composition according to claim 1, comprising from about 5 to about 20 wt % of monodisperse particles.

7. An ink jet ink set comprising:
   (1) an ink jet ink comprising a carrier liquid and a colorant, and
   (2) an ink jet ink as set forth in claim 1, containing substantially no colorant.

8. The ink set according to claim 7, comprising at least three differently colored inks.

9. An ink jet ink set comprising at least three differently colored ink jet inks, wherein at least one of the inks is an inkjet ink as set forth in claim 1.

10. A method for ink jet printing onto a substrate, comprising the steps of:
   (a) providing an ink jet printer that is responsive to digital data signals;
   (b) loading the printer with a substrate to be printed;
   (c) loading the printer with an ink as set forth in claim 1; and
   (d) printing onto the substrate using the ink or inkjet ink set in response to the digital date signals.

11. A method for ink jet printing onto a substrate, comprising the steps of:
   (a) providing an ink jet printer that is responsive to digital data signals;
   (b) loading the printer with a substrate to be printed;
   (c) loading the printer with an ink jet ink as set forth in claim 7; and
   (d) printing onto the substrate using the ink or inkjet ink set in response to the digital data signals.

* * * * *